Sept. 20, 1966  A. A. VARELA ETAL  3,274,593
HEIGHT FINDING RADAR SYSTEM
Filed March 26, 1953  2 Sheets-Sheet 2

INVENTORS
ARTHUR A. VARELA
ELVIN E. HERMAN
BY
ATTORNEYS

United States Patent Office 3,274,593
Patented Sept. 20, 1966

3,274,593
HEIGHT FINDING RADAR SYSTEM
Arthur A. Varela, Alexandria, Va. (Naval Research Laboratory, Anacostia Station, Washington 25, D.C.), and Elvin E. Herman, 6864 Glacier Drive, Riverside, Calif.
Filed Mar. 26, 1953, Ser. No. 344,912
9 Claims. (Cl. 343—16)

The invention described herein may be manufactured and used by or for the Government of the United States of America for governmental purposes without the payment of any royalties thereon or therefor.

This invention relates to height finding radio locator apparatus of the stacked-beam type and more particularly to improvement in the target elevation angle computer thereof.

Theoretically, a stacked-beam system affords continuous height finding information in the vertical plane between the axis of the uppermost and lowermost beams. In practice, however, difficulties have been encountered in obtaining accurate and positive target position resolution when the target appears at or near a beam axis.

In the copending A. A. Varela application, Serial No. 279,679, filed March 31, 1952, for Height Finding Radar System, now Patent Number 3,064,252, there is described a stacked-beam system which sufficiently confines the range of target position ambiguity such that the system is adequate for purposes where a continuous high degree of accuracy over the vertical range is not absolutely essential. Specifically, the system includes: a transmitter which radiates a field directional in azimuth but substantially continuous in elevation; a plurality of directional receiving antennae arranged so that the individual beam patterns therefor are fanned in elevation; a logarithmic receiver for each of the antennae; and a target elevation angle computer that selects the beam pair between the axes of which the target is located; and generates a pulse output whose amplitude represents the actual target elevation angle.

The elevation angle computer of the above system, however, has the aforementioned disadvantage of an appreciable range of elevation ambiguity when the object lies on or near the center of one of the receiving beams.

It is, therefore, an object of the present invention to provide a stacked-beam height finding radio locator capable of accurate target position resolution throughout the vertical range thereof.

Another object of the present invention is to provide in a stacked-beam locator system an improved elevation angle computer.

A further object of the present invention is to provide in a stacked-beam system an elevation angle computer which utilizes adjacent beam pair difference signals for switching purposes as a target moves through a beam center, thereby improving the system sensitivity around the beam axes.

Other objects and advantages of the present invention will become apparent from the following description when read in conjunction with the accompanying drawings in which:

FIGURE 3 is a schematic diagram of a simplified selector circuit shown in block in FIGURE 2.

Figure 1:
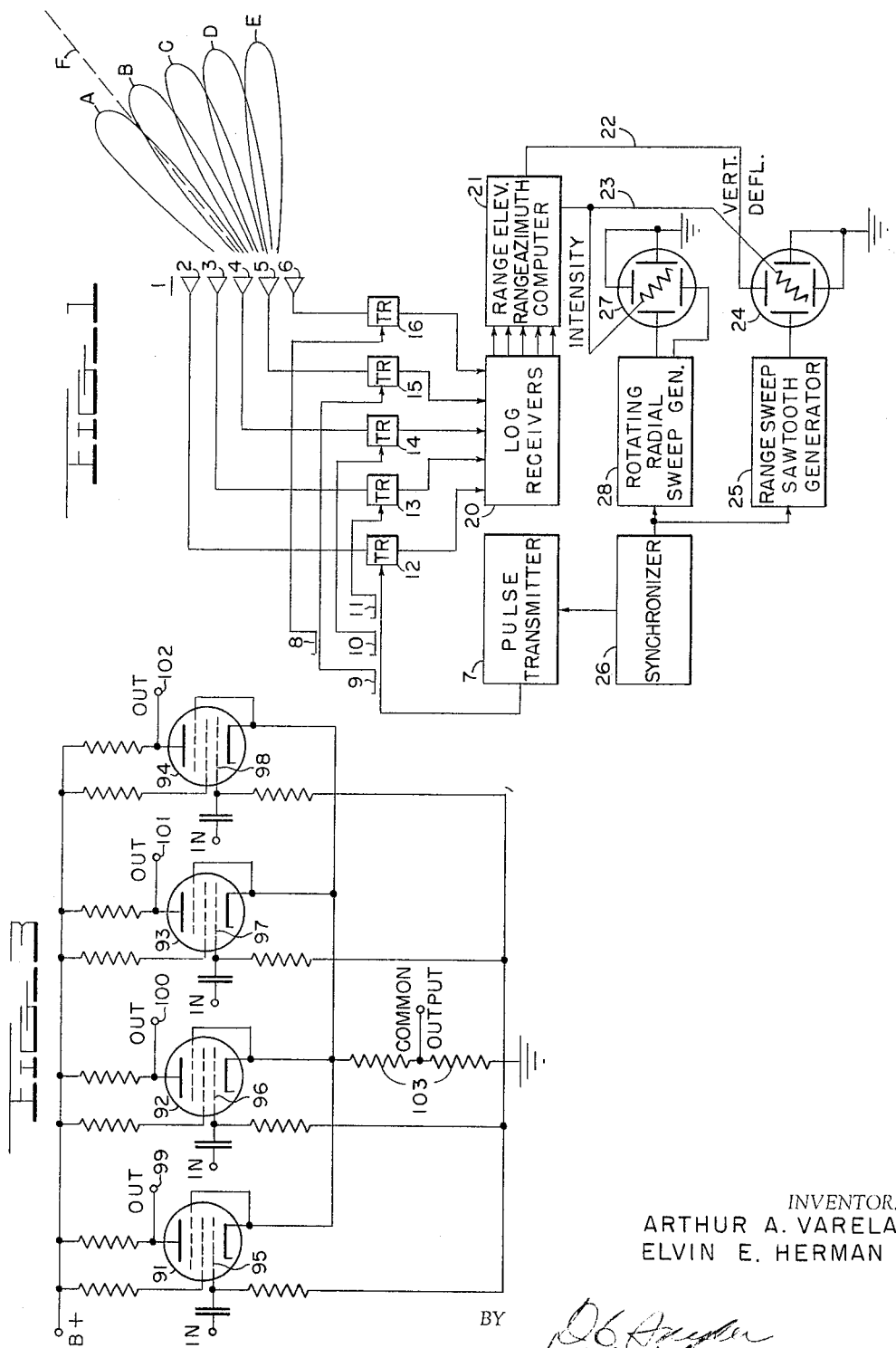
FIGURE 1 is a block diagram of a stacked-beam system to which the present invention is applicable.

With reference to FIGURE 1 there is shown a simplified block diagram of a stacked-beam height finding system of the type described in the aforesaid copending application Serial No. 279,679 to which the principles of the present invention may be applied. The system as herein illustrated provides for five overlapping receiver beams A, B, C, D and E which are fanned in the manner indicated in elevation angle while being directional in azimuth, the beams representing generally the response pattern of the antennae array schematically designated at 1, and specifically the respective patterns of individual antenna elements 2, 3, 4, 5 and 6. Array 1 may be any directional antenna means which produces overlapping beam patterns. In addition, the individual beam patterns should be preferably approximate as nearly as possible as exponential function as the direction angle deviates from the beam axis. Although most directional antenna beam patterns are exponential in character near the beam center, an array utilizing a split paraboloid reflector is preferred since the beam pattern exponential characteristic extends to direction angles quite removed from the beam center thereof. Thus, array 1 may typically comprise a split paraboloid reflector having five stacked feeders, whereby continuous coverage from the lowermost to the uppermost beam in the vertical plane is afforded according to the copending application aforesaid.

Energy from pulse transmitter 7, which serves the function of generating a series of time-spaced pulses to be radiated into space, is fed through directional power dividers 8, 9, 10 and 11, conventional TR boxes 12, 13, 14, 15 and 16 to array 1 to provide the radiated electromagnetic field in the desired distribution. The power may be either graduated or equally divided in the respective field patterns A, B, C, D and E as illustrated in FIGURE 1. It is to be understood, however, that any suitable means of providing the required field distribution may be employed, the requirements imposed by design considerations controlling the specific form of the transmitting apparatus. For example, the number of beams may be increased or decreased, and individual transmitters, rather than a common transmitter, with separation of transmitting and receiving antennae, might be preferred according to the purpose for which the system is designed.

Echo signals appearing at the individual elements 2 to 6 in array 1 are respectively received and amplified logarithmically by separate receiver channels in the system receiver generally designated at 20. While not essential to the present invention, logarithmic reception is preferred since it is desirable to compress the wide range of signal amplitudes to be handled while in addition the necessity of providing receiver output signals which are a function of the ratio of adjacent channel input signals is considerably simplified, as will be described. The video output of receiver 20 is fed to elevation angle computer 21, to be later described, which reduces the several signals supplied by the antennae of array 1 in response to the incoming energy to a common channel intensity signal at line 23 and a video elevation signal at line 22. Both of these signals occur simultaneously at a time after the transmission of a pulse from transmitter 7 proportional to the range of the pulse energy reflecting object giving rise to the received energy. The video signal at line 22 will have a magnitude which is proportional to the elevation angle of the reflected energy from the object being located.

For visually presenting range-elevation angle information, cathode ray tube 24, preferably of the electrostatic type, is provided to which the range-elevation angle signal from line 22 is applied. In the usual manner, a range time base for tube 24 is obtained by applying to the horizontal deflection plates thereof a range sweep sawtooth wave from sawtooth generator 25, coupled to conventional sync pulse generator 26 which provides the keying control function for synchronizing the initiation of the transmitter pulse and the indicator range sweep.

With the provision of a vertical scale on the face of tube 24, calibrated in terms of elevation-angle, the application of the elevation video signals from line 22 to the vertical deflection plates and intensity signals from line 23 to the intensity grid thereof affords a visual presentation wherein the peak of the elevation video signal appearing on the face of tube 24 is indicative of the elevation-angle of the received energy wave, and hence, indicative of the elevation-angle of the object being located. In addition range-azimuth indications may be obtained by applying intensity signals from line 23 to the intensity control electrode of conventional plan position (PPI) indicator 27, the electron beam thereof being caused by rotating radial sweep generator 28, also synchronized by sync pulse generator 26, to trace a radial and rotating path in the usual manner.

As described in the Varela application supra, computer 21 first operates on the echo signals received by antenna elements 2 to 6, and associated beams A to E, to select that pair of adjacent beams which supplies the greatest instantaneous energy. Responsive to this selection a pulse having a fixed characteristic representative of the selected beam pair is generated. For example, computer 21 may include respective pedestal pulse generators for each pair of adjacent beams, the pedestal pulse output of any one of which has an amplitude dependent upon the elevation-angle of a reference line common to the represented beam pair. Conveniently, the reference line may be the line containing the points at which the beams in the particular pair have equal intensity or response, commonly termed the beam pair crossover, as at line F in FIGURE 1, and representative of beam pair AB. The pedestal pulse representative of the selected beam pair is then interpolated by adding thereto an interpolating voltage of a magnitude and sign dependent upon the relative signal strengths received by the selected beam pair whereby a signal whose amplitude is representative of the target elevation-angle is obtained.

In the copending application to Varela, referred to above, the pedestal pulse interpolation voltage, which, as described above, should be dependent on relative signal strengths, thus a function related to the signal ratio, is simply the logarithmic difference voltage of the signals received from the selected beam pair. Specifically, this difference voltage is equal to the log of the voltage signal received by the upper beam of the selected pair minus the log of the voltage signal received by the lower beam of the selected pair, which will be understood to be equivalent to the logarithmic ratio of the voltage signals. In general this interpolation voltage closely approximates a linear function of the angular position of the target relative to the including beam centers since the signals received by the respective logarithmic receiving channels are exponential in character. Just beyond the beam centers, however, the logarithmic difference function becomes quite erratic due primarily to irregularities in the beam patterns. Thus, to avoid error, the computer selector must accurately switch from one beam pair and associated receivers to the next pair as a target moves through a beam center.

The elevation angle computer of the aforesaid copending application of Varela included as a beam pair selector, apparatus responsive to the relative sums of the signals from the pairs of receiver channels. Near the beam centers, however, the presently known peak selector circuits are incapable of resolving sufficiently well the relatively small differential in level offered by the sum signals from adjacent beam pairs. The same peak selector circuits afford considerably finer target resolution, however, if the relative differences, rather than the sums, of the signals from the pairs of receiver channels are used as the basis of selection since near the beam centers the percentage variation in the difference signals is greater as the target position changes. By way of illustration, a target is assumed near the center of beam B of FIGURE 1. Considering only the signals received on beams A, B, and C, there may be derived from these beams the sum signals $(B+A)$ and $(B+C)$ and the difference signals $(A-B)$ and $(B-C)$ which are to be respectively compared in relation to a small change in signals A ($\Delta A$) and C ($\Delta C$), signal B remaining substantially constant in magnitude over slight variations of target positions around the beam axis thereof. Assigning arbitrary numerical values of $B=15$, $A=C=5$, $\Delta A=+\frac{1}{2}$, and $\Delta C=-\frac{1}{2}$, it will be apparent that the percentage difference in the sum signals $(B+A+\Delta A)$ and $(B+C+\Delta C)$ is approximately 5% whereas there is a 10% difference in the difference signals $[B-(A+\Delta A)]$ and $[B-(C+\Delta C)]$. As $\Delta A$ and $\Delta C$ become increasingly smaller, obviously the larger percentage variation in the difference signals increases in significance.

Figure 2:
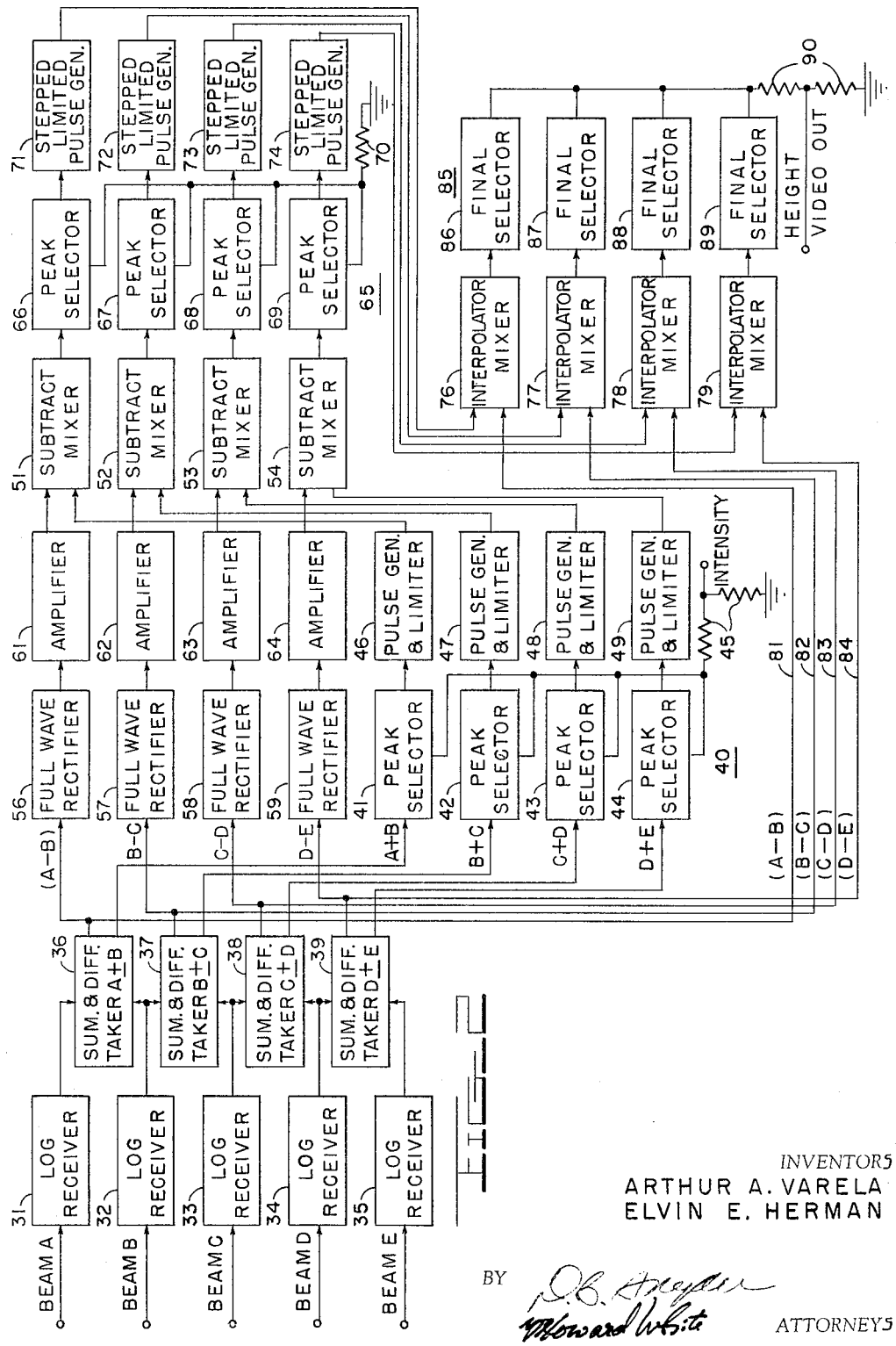
FIGURE 2 is a more detailed block diagram of the elevation angle computer shown in block in FIGURE 1.

Referring now to FIGURE 2 there is illustrated an elevation angle computer which selects the antenna beam pair including the target by means of a peak selector responsive to the relative magnitude of the instantaneous difference signals received on the pairs of receiver channels alluded to with reference to FIGURE 1. As shown, signals appearing at antennae 2–6, in response to a target intercepting the response patterns A to E, are respectively fed from the associated antenna elements to logarithmic receivers 31, 32, 33, 34 and 35, of any suitable well-known design, the respective video outputs of which are proportional to the logarithms of the inputs thereto. Coupled to the output of each adjacent pair of receivers are respective sum and difference takers represented as the single blocks 36, 37, 38 and 39. These elements are of conventional design and may take the form shown in the aforementioned Varela application. Specifically, these circuits should be capable of providing separate video outputs equal to the sum and to the difference of a pair of inputs thereto. The sum outputs of the sum and difference takers 36–39 are in turn fed to a peak selector circuit generally indicated at 40 which is equipped with a plurality of individual output terminals equal in number to the number of sum input signals and whose function it is to pass to the appropriate output terminal only the largest instantaneous sum signal. As illustrated, selector 40 comprises a plurality of separate selector channels 41 through 44 all interconnected as by a common resistor network 45 arranged so that the individual selector channel which receives the largest instantaneous input signals will block the other channels and yet translate to its output terminal the applied sum signal. In normal operation where the echo emanates from a point clearly sufficiently off-line of any of the beam axes (A to E FIGURE 1) only one of the selector channels 41 through 44 will operate, but in the condition where the echo emanates from a point near the axes of any of the intermediate beams B to D, as many as two of the selector channels 41 to 44 may operate to deliver simultaneous outputs. By way of example, assuming a target at the center of beam B, the sum outputs $(B+A)$ and $(B+C)$ from elements 36 and 37 respectively, will be substantially equal resulting in an output from both selector units 41 and 42, whereas, should the target appear at the crossover of beams A and B, the output from element 36 will be of a relative magnitude so as to cause selector 40 to produce an output only at unit 41. In either case, selector 40 provides an output across the common resistor network 45 which may supply the intensity modulation signal for line 23 in FIGURE 1.

It will thus be apparent from the foregoing discussion that in certain situations where the echo signal emanates from a point along or near one of the intermediate beam (B to D) axes, two of the selector channels 41 to 44 may produce simultaneous output signals thereby giving rise to some ambiguity in the beam pair selectors action of selector 40. To avoid this ambiguity, the circuits including pulse generators 46 to 49, full wave rectifiers 56 to 59, amplifiers 61 to 64 subtract mixers 51 to 54 and peak selectors 66 to 69 are added. The purpose and operation of these circuits will now be described.

The pulse generators and limiters 46, 47, 48 and 49, each of which may typically comprise a conventional triggered amplifier and crystal diode limiter, are coupled to the respective input terminals of the selector channels 41 to 44 and individually respond to the outputs from the selector 40 to produce pulses of limited and equal amplitude. The production of a pulse or pulses by units 46–49 serves as a preliminary selection of adjacent beam pairs according to the sensitivity of selector 40 with respect to the relative differential of the sum signal inputs thereto. This preliminary selection is desirable inasmuch as the instantaneous magnitude of the strongest difference signal obtained from units 36–39 is not generally indicative of the beam pair receiving the greatest instantaneous energy as will be explained. The preliminary selection by selector 40 thus provides a reference from which a finer selection of beam pairs may be had through utilization of the difference signals. For example, assuming a target near the center of beam B, peak selector 40 operating on the sum signals may not be sufficiently sensitive to differentiate between the sum signals $(B+A)$ and $(B+C)$ from units 36 to 37 respectievly with the result that both limiters 46 and 47 will produce respective pulses of equal amplitude. In this case the finer selectively offered by the difference signals $(A-B)$ and $(B-C)$ may then be utilized to select the proper receiver channel AB or BC to determine between which pair of beam centers AB or BC the target is located. For this purpose the limiter pulses from units 46 to 49 are respectively fed to subtract mixers 51, 52, 53 and 54 in which the reference limiter pulses are to be respectively compared with the system difference signals, mixers 51–54 being conventional elements capable of providing the arithmetic difference of a pair of signals contingent upon the application thereto of at least a given one of the signals.

The difference takers 36 to 39 as outlined in the Varela application provide output pulses which vary in amplitude and sign according to the position of the target relative to the axes of associated beam pair. To illustrate, consider difference taker 36 and assume in the first instance the target is centered on the A beam. In this condition the output from difference taker 36 is a maximum positive pulse. Now assume that the elevation angle of the target shifts to a position in line with the crossover point of beams A and B. In this case the output difference from receivers 31 and 32 is zero and likewise the output of difference taker 36 is zero. If now the targets continue to change elevation to a point in line with the axes of beam B the output of the difference taker 36 will be a negative pulse of maximum amplitude.

According to the present invention only the absolute difference in signal present in the beams is important to beam pair selections. Thus, the difference signal outputs of elements 36 to 39 are respectively passed through full wave rectifier elements 56, 57, 58 and 59 from which is obtained the absolute value of the difference signals, i.e.

$$|\log A - \log B| \text{ or } |\log A/B|$$

As indicated elements 56–59 may conveniently be conventional full-wave rectifiers, it being understood, however, that any means which provides as an output the absolute value of input signals fed thereto will suffice. It will be observed that for a target near a beam center, for example, just above the axes of beam B, the absolute value of the output from difference taker 36 will be less than the absolute value of the output from difference taker 37. This result obtains since, assuming as above three target positions as follows:

On the center of beam A; at the crossover of beams A and B; and on the center of beam B; the logarithmic difference, or ratio, output of element 36 is a positive maximum, zero, and a negative maximum respectively. Thus, the absolute value of the logarithmic difference signal approaches zero as the target moves toward the corresponding beam crossover, and as the target has been assumed to be nearer the crossover point of beam pair AB than beam pair BC, element 36 has the lesser output.

As described hereinbefore, the percentage variation in the difference signals is greater than that of the sum signals with variation in target position. The difference signals, however, are inherently of a relatively lesser order of magnitude and to best utilize the greater percentage variation thereof the difference signals are preferably respectively amplified to a level commensurate with the output level of limiters 46 to 49, the output pulses of limiters 46 to 49 being derived from the sum signals and being the pulses with which the difference signals are to be compared. The absolute value derivatives of the difference signals are therefore amplified by suitable amplifiers 61, 62, 63 and 64, and respectively applied to subtract mixers 51 to 54, the output of an arbitrary one of which is the difference between the limited pulse and the absolute value of the difference signal from the corresponding pulse generator and limiters 46–49 and amplifiers 61–64. As the absolute value of the difference signal for the pair of beams, between the centers of which the target lies, is smaller than the values for the next adjacent pairs, subtracting the absolute values from pulses of equal amplitude causes the subtract mixer, corresponding to the proper adjacent beam pair, to provide the highest peak output. Thus, by applying the output of subtract mixers 51 to 54 to a second peak selector, generally designated at 65, the subtract mixer supplying the greatest output may readily be selected to the exclusion of the remaining mixer outputs. Selector 65 is similar to selector 40, and includes respective peak selector units 66, 67, 68 and 69 and common resistor 70.

Peak selector units 66 to 69 are respectively connected to pulse generators 71 to 74 which furnish a limited, or pedestal pulse, output only from the particular unit thereof receiving a triggering pulse from the corresponding peak selector unit. Pulse generators 71 to 74 may be similar in design to pulse generator and limiters 46 to 49 except that the pedestal pulse outputs therefrom are progressively stepped in amplitude to provide a means for representing or identifying the respective beam pairs and associated receiver channels. Conveniently, the stepped pulse outputs of generators 71 to 74 may have respective amplitudes corresponding to the progressively increasing elevation angles of the beam pair crossover points, i.e. arbitrarily setting the crossover points beam pairs AB, BC, CD and DE at 20°, 15°, 10° and 5° respectively, the pedestal pulses of generators 71 to 74 may have respective amplitudes in volts of 20, 15, 10 and 5.

The pedestal pulse outputs of generators 71 to 74 are mixed with the respective bipolar linearly varying difference signals from elements 36 to 39 at respective mixer circuits 76 to 79, which may be similar in design to mixers 51 to 54, whereby the proper pedestal pulse output of the pulse generators 71, 72, 73 and 74, selected by the triggering of the corresponding one of peak selector units 66 to 69, is caused to be modified so as to be indicative of the precise elevation angle of the target. In this connection, it will be understood that while the logarithmic difference signal characteristic for a pair of adjacent beams is a linear representation of the target position relative to the including beam axes, passing through zero at the beam crossover, the positive and negative maximum difference signals may not be equal in amplitude to one-half of a pedestal pulse step. Obviously such as equivalence is necessary to provide a continuous and linear characteristic computer output. It may thus be necessary to insert calibration amplifiers, now shown, in lines 81 to 84 for this purpose.

A final selector 85, substantially the same as selectors 40 and 65 and having respective selector units 86, 87, 88 and 89 and common resistor 90, may be provided for selecting the echo of higher altitude apparently produced by two targets at the same azimuth and range but at different elevations, in order to give preference to a high target, e.g., an aircraft, over ground clutter. The output of final selector 85, appearing across resistor 90, is proportional to target elevation angle and is the signal supplied by line 22 in FIGURE 1.

FIGURE 3 schematically illustrates one of the forms selectors 40 and 65 may take. The circuit includes a series of tubes 91, 92, 93 and 94 which, with the usual input and output parameters, may respectively comprise peak selector units 41 to 44 and 66 to 69. Preferably tubes 91 to 94 are sharp cut-off pentodes although other tube types may be used. The input signals to the selector circuit from the preceding units are applied to control grids 95, 96, 97 and 98 while respective output terminals 99, 100, 101 and 102 at the tube plate circuits are provided to feed selected pulses to the succeeding computer units. Common biasing resistor 103 in the cathode circuit of each tube provides a mutually degenerative characteristic required for selection operation and, in addition, comprises the common output circuit for the selector alluded to above. Resistor 103 should be as high as the video frequency band-pass requirements permit and a minimum of several times the value of the tube plate resistors.

In operation a relatively strong positive pulse to the control grid of one of tubes 95 to 98 will cause that tube to conduct, resulting in a high potential drop across resistor 103. The tube initially carrying the highest current will not be cut off, but the drop across resistor 103 is reflected as a high negative bias at the control grids of the remaining tubes, sufficient to drive those tubes below cut off. A negative pulse derived from the plate circuit terminals, 99 to 102, of the conducting tube serves as the individual selector unit output while the positive pulse across resistor 103 furnishes the selector common output.

Selector 85 may also be of the type shown in FIGURE 3 except that plate resistors for the tubes and output terminals 99 to 102 may be omitted as only a common output is required (resistor 90 in FIGURE 2 and line 22 in FIGURE 1).

Since the computer operation depends upon coincidence of the difference signals from difference takes 36 to 39 with the limited equal pulses at subtract mixers 51 to 54 and with the stepped pedestal pulses at interpolator mixers 76 to 79, any time delays in the beam pair selection units of the computer must be compensated for. Appropriate time delay elements, such as artificial transmission lines, not shown, may be inserted for this purpose, for example, in lines 81 to 84.

The computer of the present invention, therefore, takes advantage of the more rapidly changing characteristics of the logarithmic difference signals, compared with the logarithmic sum signals, as a target moves toward a beam center, to provide more accurate and positive target position resolution. This is accomplished as described, by basing the selection of the appropriate pair of adjacent receiver channels on the relative absolute values of the difference signals. However, in the preferred embodiment of the invention, the preliminary selection performed by sum takers 36 to 39, first selector 40 and subtract mixers 51 to 54 is desirable particularly where the type of antenna used in the system has appreciable deviation from the desired exponential beam pattern at points removed from the beam center. For example, should a target appear at the crossover point at beams A and B, the corresponding difference signal would be zero, but beams D and E may give rise to a relative strong difference signal due either to a weaker target or to thermal noise. Obviously, peak selecting on the difference signals alone would be ineffective whereas by first selecting according to the sum signals, as described, improper difference signals are easily discarded. Antenna systems of the split paraboloid type have severe deviation from an exponential pattern at angles from the beam center exceeding the beam width but are preferred because of superior gain and lower side lobes.

Although the embodiment of the present invention disclosed in the drawings and preceding specification is preferred, it will be apparent to those skilled in the art that many modifications may be made without departing from the scope and spirit of the broadest aspects thereof.

What is claimed is:

1. Target locating apparatus comprising a radio transmitter for radiating energy in a selected direction, a receiving antenna array providing more than two stacked-beam patterns with an overlap on adjacent beams for receiving said energy after reflection from a remote target, logarithmic comparison means coupled to said antenna array for generating respective voltages proportional to the relative amplitude of instantaneous energy received on each pair of adjacent beams, means for respectively deriving the absolute value of said voltages and means coupled to said derivation means and responsive to the absolute value voltage outputs therefrom to select the pair of adjacent beams between which a target is located.

2. Target locating apparatus comprising a radio transmitter for radiating energy in a selected direction, a receiving antenna array providing more than two stacked-beam patterns with an overlap on adjacent beams for receiving said energy after reflection from a remote target, logarithmic ratio comparison means coupled to said array for generating respective voltages proportional to the relative amplitude of energy received on the beams in each pair of adjacent beams, means for deriving the absolute value of said voltages, sum comparison means for comparing the total energy received on each pair of adjacent beams, and selector means coupled to said absolute value derivation means and said sum comparison means for selecting the pair of adjacent beams between which target is located.

3. In a receiver for a target location system including an antenna array having a plurality of overlapping adjacent beam patterns in excess of two progressively displaced in elevation angle, a direction angle computer comprising respective ratio detection means for generating voltages proportional to the relative amplitude of energy received on the beams in each pair of adjacent beams, means for respectively deriving the absolute value of said voltages, and means responsive to the absolute value of said voltages to select the pair of adjacent beams between the axes of which a target is located.

4. In a receiver for a target location system which includes an antenna array exhibiting a plurality of overlapping adjacent beam patterns in excess of two progressively displaced in elevation angle, a direction angle computer comprising logarithmic ratio detector means for generating respective voltages proportional to the relative amplitude of energy received on the beams in each pair of adjacent beams, means for deriving the absolute value of said voltages, summation means for generating respective voltages proportional to the amplitude of energy received on each pair of adjacent beams, and selector means coupled to said absolute value derivation means and said summation means and responsive thereto to select the pair of adjacent beams between which a target is located.

5. In a receiver for a target location system which includes an antenna array having a plurality of overlapping adjacent beam patterns in excess of two progressively displaced in elevation angle, a direction angle computer comprising logarithmic ratio detector means for generating respective voltages proportional to the relative amplitude of energy received on the beams in each pair of adjacent beams, means for respectively deriving the absolute value of said voltages, summation means means for generating respective voltages proportional to the amplitude of energy received on each pair of adjacent beams, resepctive mixer means for combining corresponding summation voltages and absolute value voltages, and means responsive to said mixer means to select the pair of adjacent beams between which a target is located.

6. In a receiver for a target location system which includes an antenna array exhibiting a plurality of overlapping adjacent beam patterns in excess of two progressively displaced in elevation angle, a direction angle computer comprising logarithmic ratio detector means for generating respective voltages proportional to the relative amplitude of energy received on the beams in each pair of adjacent beams, means for respectively deriving the absolute value of said voltages, summation means for generating respective voltages proportional to the amplitude of energy received on each pair of adjacent beams, respective mixer means for combining corresponding summation voltages and absolute value voltages, respective selector means responsive to said mixer means to select the pair of adjacent beams between which a target is located, and interpolating means responsive to said selector means and said ratio detector means to generate a voltage proportional to the elevation angle of said target.

7. A direction angle computer for target location system receiver which includes a receiving antenna array exhibiting a plurality of directive beam patterns in excess of two progressively displaced in elevation angle comprising means for generating respective voltages proportional to the total amplitude of instantaneous energy received on each pair of adjacent beams, means for non-linearly increasing the amplitude differential between said voltages, and peak selector means responsive to said last-named means for selecting the pair of adjacent beams between the axes of which target is located.

8. A direction angle computer for target location system receiver which includes a receiving antenna array exhibiting a plurality of directive beam patterns in excess of two progressively displaced in elevation angle comprising means for generating respective voltages proportional to the total amplitude of instantaneous energy received on each pair of adjacent beams, respective equal-amplitude pedestal pulse generating means for said pairs of beams, peak selector means responsive to said voltages having the higher amplitudes to select the corresponding pedestal generating means, ratio detector means for generating respective voltages proportional to the relative amplitude of energy received on the beams in each pair of adjacent beams, means for respectively modifying the pedestal pulse outputs of said selected pedestal generating means according to the absolute value of the corresponding detector means output voltage, and further peak selector means responsive to said modified pedestal pulses to select the pair of adjacent beams between the axis of which a target is located.

9. A direction angle computer for a target location system receiver which includes a receiving antenna array exhibiting a plurality of overlapping adjacent beam patterns in excess of two progressively displaced in elevation angle comprising logarithmic ratio detector means for generating respective voltages proportional to the relative amplitude of energy received on the beams in each pair of adjacent beams, means for deriving the absolute value of said detector voltages, summation means for generating respective voltages proportional to the total amplitude of energy received on each pair of adjacent beams, respective equal-amplitude pedestal pulse generating means for said pairs of beams, first respective peak selector means responsive to the summation voltages having the greater amplitudes to select the corresponding pedestal pulse means, respective mixer means coupled to said pedestal pulse means and said absolute value derivation means for subtracting the corresponding outputs thereof, and second respective peak selector means coupled to said mixer means for selecting the output thereof corresponding to the pair of adjacent beams between the axes of which a target is located.

References Cited by the Examiner

UNITED STATES PATENTS

| | | | |
|---|---|---|---|
| 2,433,332 | 12/1947 | Benioff | 343—11 |
| 2,553,294 | 5/1951 | Blewett | 343—11 |

CHESTER L. JUSTUS, *Primary Examiner.*

NORMAN H. EVANS, *Examiner.*

A. K. GREER, R. D. BENNETT, *Assistant Examiners.*